3,342,823
PREPARATION OF QUINACRIDONES USING POLYPHOSPHORIC ACID
Chi K. Dien, Williamsville, N.Y., assignor to Allied Chemical Corporation, New York, N.Y., a corporation of New York
No Drawing. Filed Oct. 24, 1960, Ser. No. 64,307
19 Claims. (Cl. 260—279)

This invention relates to the preparation of quinacridone, and particularly compounds having the general formula

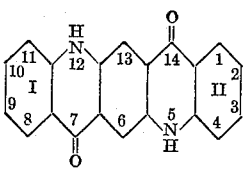

wherein the benzene nuclei I and II are unsubstituted or contain substituents.

It relates more particularly to an improved process for the preparation of quinacridones from 2,5-diarylaminoterephthalic compounds, and particularly from 2,5-diarylamino-terephthalic acids and esters thereof, whereby a number of advantages are secured.

Quinacridones are known to result from the ring-closure of 2,5-diarylamino-terephthalic acids in which each of the aryl radicals is unsubstituted in an ortho-position to the amino group. Thus, linear quinacridone (quinacridine-7,14-dione) and its alkyl, alkoxy, halogen and benzo derivatives are known to result from the ring-closure with elimination of two molecules of water from 2,5-dianilino-terephthalic acid, various 2,5-ditoluidino-terephthalic acids, various 2,5-dixylidino-terephthalic acids, various 2,5-dianisido-terephthalic acids, various 2,5-dinaphthyl-amino-terephthalic acids, and various halogenated derivatives of them by heating with ring-closing or condensing agents which remove the elements of water.

None of the ring-closing agents heretofore employed gave good results, particularly in the case of ring-closure of the 2,5-dianilino-terephthalic acid to give the parent linear quanicridone of the above formula. As pointed out by Liebermann in Annalen, vol. 518, pages 245 to 252, the usual condensing agents generally produce crude products which are difficult and tedious to purify. The special conditions preferred by Liebermann, fusion with boric acid, require operation at high temperatures.

In an attempt to avoid the disadvantages of ring-closure of the 2,5-dianilino-terephthalic acid, it has been more recently proposed to obtain linear quinacridone by starting with the diethyl ester of 2,5-dianilino-3,6-dihydroterephthalate and cyclizing it under non-oxidizing conditions to give dihydro-quinacridone, which is then oxidized to the desired linear quinacridone. While this method is perhaps more convenient that the Liebermann fusion process, it suffers from a number of disadvantages, such as high temperature operation involving the use of high boiling solvents.

According to the present invention, the conversion of 2,5-diarylamino terephthalic acids to quinacridones by ring-closure condensation is carried out with the aid of so-called "polyphosphoric acids" as ring-closing agents (condensing agents), especially in connection with the manufacture of quinacridone pigments.

I have discovered that the said polyphosphoric acids, which are identified more fully below, constitute ring-closing agents for this reaction having a number of advantages and leading to a number of beneficial results.

Thus, I have discovered that said polyphosphoric acids are highly effective ring-closing agents for 2,5-diarylamino-terephthalic acids and especially 2,5-dianilino-terephthalic acid and its homologues, leading to high yields of linear quinacridones of relatively high purity; the reaction results in substantially complete conversion of the 2,5-diarylamino-terephthalic acids to linear quinacridones with relatively little conversion to undesired by-products.

Further, I have discovered that the liquid polyphosphoric acids having the range of composition preferably employed in accordance with the present invention, set out below, are solvents for the 2,5-diarylamino-terephthalic acids, and that the reaction can be carried out in the liquid phase employing the polyphosphoric acids themselves as the reaction media, thereby simplifying the process.

I have also found that many of the linear quanacridones resulting from the ring-closure of 2,5-diarylamino-terephthalic acids are soluble in said polyphosphoric acids and can be precipitated from solutions therein by dilution, for example, with water; thereby making possible the direct obtainment of the quinacridones in the finely divided crystal form required for use as pigments in the ink, coating, plastic and related industries and without requiring special additional grinding or other treatments commonly employed for the conversion of insoluble colored compounds to finely divided pigment form. Further by controlling the concentration, temperature and other conditions of dilution, in accordance with the well known "acid-pasting" and "swelling" procedures commonly employed in the pigment and dyestuff arts, the particle size and crystal form of the linear quinacridones can be readily varied and controlled. This advantage is of considerable commercial importance, since it simplifies the manufacturing process and avoids the necessity for grinding equipment and time-consuming grinding operations.

It is quite surprising that the ring closes so completely and rapidly using polyphosphoric acids as ring-closing agent, since it is known that heating 2,5-dianilino-terephthalic acid with a $P_2O_5$-cymene mixture yields only 44% of quinacridone, despite the fact that $P_2O_5$ is a much stronger dehydrating agent than are the polyphosphoric acids employed in the process of the present invention; and 100% $H_3PO_4$ is not effective at all. It is also surprising that the quinacridone is produced directly in pigmentary form suitable for commercial use as color pigment.

Another important and unexpected advantage of the use of the polyphosphoric acids for the preparation of quinacridones in accordance with the present invention is their action as ring-closing and condensing agents for esters of 2,5-diarylamino-terephthalic acids. I have discovered that quinacridones are directly produced by heating the esters, and especially the lower dialkyl esters, of 2,5-diarylamino-terephthalic acids with the polyphosphoric acids. This discovery is of considerable importance in view of the face that, although esters of 2,5-diarylamino-terephthalic acids were known (see for example, Annalen, vol. 404 (1914), pages 272 ff.), heretofore they have to be separately hydrolyzed to the free 2,5-diarylaminoterephthalic acids, separated from the hydrolysis reaction medium, and recovered, before they could be employed as starting materials for quinacridones. By subjecting the esters to ring-closure by means of polyphosphoric acids in accordance with the present invention, such separate hydrolysis is avoided and the quinacridones are obtained directly from the esters.

The polyphosphoric acids employed as ring-closing agents for the 2,5-diarylamino-terephthalic acids and esters to linear quinacridones in accordance with the present invention are known viscous liquid compositions which are essentially mixtures of a plurality of oxygen acids of pentavalent phosphorus the principal components of which are condensation polymers of orthophosphoric acid, particularly linear polymers defined by the structural formula

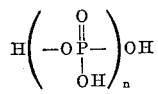

wherein $n$ in an integer at least equal to 2.

Each of the component acids may be regarded as a chemical combination of water and $P_2O_5$ in a characteristic stiochiometric ratio; and the composition of the polyphosphoric acids may be similarly defined in terms of the weight percent of $P_2O_5$ equivalent to said mixture, based on total phosphorus content of said mixture determined by analysis (termed the "$P_2O_5$ equivalent"), or in terms of the related weight percent of $H_3PO_4$ equivalent to said mixture (termed the "$H_3PO_4$ equivalent").

Much accurate information on the molecular composition of the polyphosphoric acids of the kind employed in accordance with the present invention has recently been obtained by use of analytical procedures involving filter paper chromatography. Data presented by B. A. Huhti and P. A. Gartaganis, 34 Canadian Journal of Research (Chemistry), pages 785–97 (1956), show that polyphosphoric acids having $P_2O_5$ equivalents of 76% to 86% consist predominantly of linear condensation polymers of orthophosphoric acid (cf. the structural formula above) together with minor amounts of water and/or orthophosphoric acid. Polyphosphoric acids having a $P_2O_5$ equivalent of 86% to 90% appear to be mixtures of high molecular weight linear condensation polymers of orthophosphoric acid together with some cyclic and crosslinked polymers thereof (cf. Thilo and Sauer, 4 J. Prakt. Chem. (1957) 324–48).

Polyphosphoric acids having a $P_2O_5$ equivalent of 82% to 84% are available commercially under various trademarks (also sometimes called "tetraphosphoric acid"). Thus, one commercial polyphosphoric acid is a clear, colorless, viscous, hydroscopic liquid with a specific gravity of approximately 2.060 at 20° C. and having a $P_2O_5$ equivalent of about 83% and an $H_3PO_4$ equivalent of about 115%. Its approximate composition is:

| | Percent |
|---|---|
| Orthophosphoric acid | 5.7 |
| Pyrophosphoric acid | 21.4 |
| Triphosphoric acid | 18.0 |
| Tetraphosphoric acid | 13.4 |
| Pentaphosphoric acid | 11.4 |
| Hexaphosphoric acid | 9.6 |
| Heptaphosphoric acid | 7.1 |
| Nonaphosphoric, higher polyphosphoric acids | 6.5 |

Other polypphosphoric acids suitable for use in accordance with the present invention can be obtained from phosphorus pentoxide or from other phosphoric acids. Thus, phosphorus pentoxide can be converted to suitable polyphosphoric acids by reaction with water or with ortho-phosphoric acid or with partially dehydrated ortho-phosphoric acid or with a polyphosphoric acid of lower concentration; or ortho-phosphoric acid can be converted to a suitable polyphosphoric acid by heating with elimination of water; or more highly concentrated polyphosphoric acids can be diluted to the desired concentration with water or with aqueous phosphoric acids (e.g. ordinary syrupy $H_3PO_4$). At least sufficient mixing and heating should be used to obtain a clear homogeneous liquid.

In general, polyphosphoric acids of such composition that their $P_2O_5$ equivalent lies within the range about 75% to about 89% (an $H_3PO_4$ equivalent of 103.5% to about 123%) are employed as ring-closing agents in accordance with the present invention. (All ranges set out herein, including the claims, include the limits thereof.) Those having a lower $P_2O_5$ equivalent are not sufficiently effective as ring-closing agents to be used. Those having a higher $P_2O_5$ equivalent than 89% are very viscous and are therefore not readily workable except at high temperatures, which lead to discolored products, or when diluted with a suitable inert diluent or solvent for the reactants, which adds to the cost and complicates the process.

In order to characterize the nature of the polyphosphoric acid employed, when a solvent or diluent is present in the reaction mixture, the polyphosphoric acid may be conveniently defined in terms of the $P_2O_5$:$H_2O$ ratio, wherein the numerator designates the $P_2O_5$ equivalent of the polyphosphoric acid, and the denominator designates the difference between the weight of the polyphosphoric acid and $P_2O_5$ equivalent of the polyphosphoric acid (it represents the total "water" present, whether chemically combined in the form of phosphoric acids or present as free water). Thus, the above concentration range of polyphosphoric acids employed in accordance with the present invention is defined by a $P_2O_5$:$H_2O$ weight ratio ranging from 3:1 to 8:1.

In the preferred practice of the present invention, polyphosphoric acids having a $P_2O_5$ equivalent within the range 80% to 87.5% (an orthophosphoric acid equivalent of 110.4% to 121% and a $P_2O_5$:$H_2O$ weight ratio of 4:1 to 7:1), and particularly commercial polyphosphoric acids of the type referred to above (having $P_2O_5$ equivalents of 82% to 84%, $H_3PO_4$ equivalents of 113% to 116%, and $P_2O_5$:$H_2O$ weight ratios of approximately 5:1), are employed as ring-closing agents.

The composition of the polyphosphoric acids set out above refers to that at the beginning of the reaction (the initial composition), since water is formed by the ring-closure reaction and decreases somewhat the $P_2O_5$ component of the reaction mixture as the reaction progresses.

In carrying out the process of the present invention, the 2,5-diarylamino-terephthalic compound to be ring-closed to a quinacridone is heated with the polyphosphoric acid until ring-closure is effected, and the resulting quinacridone is recovered from the reaction mixture.

Various 2,5-diarylamino-terephthalic acids and esters thereof can be employed as starting materials for the process of the present invention. Thus, quinacridones substituted in one or more of the positions 1, 2, 3, 4, 8, 9, 10 and 11 by substituents such as halogen atoms, or alkyl, alkoxy, aryl or benzo radicals, may be prepared by starting with appropriate 2,5-diarylamino-terephthalic acids or esters thereof.

The arylamino radical may be derived from aniline or from its various substitution derivatives, particularly those in which the substituents are selected from the group consisting of halogen (especially chlorine), lower alkyl, lower alkoxy, aryl (especially phenyl) and benzo. Such diarylamino-terephthalic acids correspond to the formula:

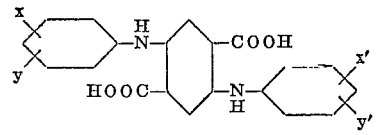

wherein $x$, $y$, $x'$ and $y'$ are individually selected from the group consisting of halogen, lower alkyl, lower alkoxy, aryl and benzo. Obviously, in order to produce quinacridone compounds by ring-closure with the carboxyl groups of the terephthalic acid nucleus, each of the arylamino radicals must be unsubstituted in one of the positions ortho to the mino group.

The esters employed as starting material include various mono- and di-alkyl, cycloalkyl, and aryl esters of the 2,5-diarylamino-terephthalic acids referred to above. The lower alkyl esters, and especially the methyl and ethyl esters, are preferred in view of their relatively lower cost.

As noted above, it is a feature of the present invention, that a preliminary hydrolysis of the esters to the free diarylamino-terephthalic acids is not required in order to employ them as starting materials for the production of linear quinacridones; when polyphosphoric acids of the type referred to above are employed as ring-closing agents in accordance with the present invention, elimination of the esterifying radical and ring-closure are both effected by the polyphosphoric acid.

Various temperatures can be used to affect the ring-closure. While temperatures of 100° C. and lower are effective and temperatures of 250° C. and higher are suitable, temperatures ranging from 120° to 200° C., and particularly 140° to 200° C., are advantageous because the reaction proceeds with a high degree of rapidity.

The duration of the heating operation will depend upon the reaction conditions employed, such as temperature, concentration of polyphosphoric acid, and proportions of polyphosphoric acid with respect to the 2,5-diarylamino-terephthalic compound employed. In general, the time of heating varies inversely with the temperature. At 120° C. to 200° C., heating for 10 to ½ hours is generally adequate.

The amount of polyphosphoric acid used depends upon other conditions of the reaction, such as the $P_2O_5$ equivalent of the polyphosphoric acid used and the nature of the reaction medium. In general, an amount by weight of polyphosphoric acid greater than that of the weight of the 2,5-diarylamino-terephthalic compound to be ring-closed, is employed. Preferably, a sufficient amount of polyphosphoric acid is employed to provide a fluid reaction medium. Thus, when employing the polyphosphoric acid as the reaction medium, an amount of polyphosphoric acid is employed which is at least theoretically sufficient to effect ring-closure of the total amount of 2,5-diarylamino-terephthalic acid or ester employed, plus an additional amount at least sufficient to permit the reaction mixture to be stirred readily at the reaction temperature employed. By employing the polyphosphoric acid both as the ring-closing agent and as the reaction medium, the process can be greatly simplified. It is also desirable to employ sufficient polyphosphoric acid to dissolve the 2,5-diarylamino-terephthalic compound and preferably also the quinacridone product. By employing the polyphosphoric acid as solvent for the quinacridone reaction product, it becomes possible to recover the quinacridone product directly in the pigment form by suitable dilution of the reaction mixture upon completion of the ring-closure.

In the preferred practice of the process of the present invention, an amount by weight of polyphosphoric acid is used ranging from about 4 to about 12 times the weight of 2,5-diarylamino-terephthalic acid or ester employed as starting material. While larger amounts of polyphosphoric acid are usable and offer the advantage of producing a more fluid reaction mass, the added benefits are generally not sufficient to warrant the extra cost.

The heating of the 2,5-diarylamino-terephthalic compound with the polyphosphoric acid can be carried out in various ways. Thus, the said reactants can be mixed together and heated to the desired reaction temperature. Or the 2,5-diarylamino-terephthalic acid or ester can be added to the hot polyphosphoric acid, for example, to a polyphosphoric acid of the concentration and in the quantity set out above which has been preheated to a temperature within the above range, and the resulting mixture then maintained within said temperature range with stirring until the ring-closure is complete.

After completion of the ring-closure reaction, the quinacridone product can be recovered from the reaction mixture in various ways. It is a feature of the invention that the quinacridone product can be recovered directly in pigment form by dilution of the reaction mixture. Accordingly, in the preferred practice of the process of the present invention, the reaction mixture is cooled below the boiling point of water, and then diluted with a large amount of water, sufficient to reduce the residual polyphosphoric acid to an aqueous phosphoric acid of less than 100% concentration and preferably less than 15% $H_3PO_4$. This results in the separation of the quinacridone product in the form of a finely divided, intensely colored pigment which can be readily recovered by a simple filtration. The dilution can be effected by adding water to the cooled reaction mixture or by pouring the cooled reaction mixture into a large excess of water (drowning), preferably with stirring. If desired, the mixture resulting from the reaction, after cooling, may first be thinned with sulfuric acid to reduce its viscosity prior to the dilution with water.

The pigment may be purified, if desired, in the usual manner employed for purifying organic pigments; for example, by reslurrying with dilute acid or aqueous caustic alkali solutions, refiltration and washing to remove traces of adhering impurities. Such purification treatments may be supplemented or replaced by the known treatment of quinacridones with alcoholic caustic alkalis, such as that disclosed by Liebermann in the Annalen reference cited above.

While in the preferred practice of the present invention the polyphosphoric acid serves not only as the ring-closing agent but also the reaction medium, the invention is not limited to such procedure however; it includes the use of other liquids which are solvents for the 2,5-diarylamino-terephthalic acids or esters thereof as reaction media, or as diluents for the reaction mixture (particularly when highly viscous polyphosphoric acids are employed); as for example, glacial acetic acid. The use of additional solvents or diluents is not required, however, and they are generally omitted.

The invention will be illustrated by the following specific examples, but it is to be understood that it is not limited to the details thereof and that changes may be made without departing from the scope of the invention. The temperatures are in degrees centigrade. The parts, percentages and ratios are by weight, unless parts are designated as by volume. Where parts are by volume, the amount signifies the volume occupied by the same number of parts by weight of water at 4° C.

EXAMPLE 1

*Part 1.*—A polyphosphoric acid was prepared by adding 300 parts of phosphorus pentoxide to 150 parts by volume (255 parts by weight) of 85% aqueous orthophosphoric acid with stirring. The temperature rose to about 180°. Stirring was continued until a clear homogeneous solution was obtained. The $H_3PO_4$ equivalent of the resulting solution was 113.2%, the $P_2O_5$ equivalent of the resulting solution was 82%, and the $H_2O$ equivalent was 18%. The $P_2O_5/H_2O$ ratio was 4.56.

*Part 2.*—Fifty parts of 2,5-dianilino-terephthalic acid were introduced with stirring into the resulting 555 parts of polyphosphoric acid solution, which had been cooled to a temperature of 140°. The mixture was heated and stirred at 140°–170° for 30 minutes, to effect ring-closure and conversion of the 2,5-dianilino-terephthalic acid to quinacridone, then was cooled to 50° and then drowned into 5,000 parts of cold water. The precipitated quinacridone was filtered off and the filter cake was washed acid-free with water. Lumps of precipitate in the filter cake were broken up by subjecting the filter cake to the action of a high-speed propeller mixer. The resulting mass was reslurried in 5000 parts of water, 15 parts of 50% aqueous sodium hydroxide solution were added, and the resulting slurry was agitated at room temperature (25°–30°) for two hours and then filtered. The filter cake was washed with water, until the effluent wash liquor was neutral, dried and ground.

The product, 41 parts of which were recovered, was a bright red pigment, directly usable as such without grinding. It was readily dispersed into printing ink, protective coating, and plastic formulations by conventional techniques to give strong and uniform colorations.

*Part 3.*—The suitability of the resulting product as a pigment for baking enamels of the type used for coating automobile bodies was determined in the following manner.

247 parts of the filter cake obtained before the final drying step in the process of Part 2 of this example (containing 35 parts of color solids) were mixed with 117 parts of a resin solution prepared from 70 parts of a non-drying, coconut oil modified alkyd resin ("Duraplex ND–76" resin of Rohm and Haas Co.) and 47 parts of xylene. When the pigment was completely "flushed" into the resin solution, the clear supernatant water phase was decanted off, and xylene was added in sufficient amount to produce 331 parts of color paste, which contained 10.6% color solids.

A baking enamel was prepared from this color paste by blending the following in a high speed mixer:

| | Parts |
|---|---|
| White base for automobile body enamel [1] | 1605 |
| 50% solution of soya modified alkyd resin in aromatic hydrocarbon solvent ("Beckosol No. 1307" resin solution) | 376 |
| 50% solution of a melamine formaldehyde resin in a mixture of butanol and xylol ("Cymel No. 245–8" of American Cyanamid) | 190 |
| Color paste | 213 |
| Xylene in sufficient amount to adjust the viscosity of the mixture to 25 seconds (# Ford cup). | |

[1] Prepared by milling together, in a ball mill for 24 hours, 960 parts of titanium dioxide pigment and 1600 parts of a 50% solution of a soya modified alkyd resin in an aromatic hydrocarbon solvent—"Beckosol No. 1307" resin solution of Reichhold Chemicals, Inc.

The resulting enamel was applied to a metal test panel by a spray gun and cured by baking at 250° F. for 30 minutes. The cured enamel was intensely and uniformly colored a bright, pleasing bluish red shade.

EXAMPLE 2

One hundred parts of 2,5 - dianilino - terephthalic acid were added to 555 parts of a hot (140°–150°) polyphosphoric acid solution which had been prepared as described in Example 1, Part 1. The mixture was stirred for 1 hour at 140°–150°. The resulting mixture was cooled to 50° and then drowned into 5000 parts of cold water. The precipitated quinacridone was filtered off. The filter cake was washed with water, reslurried in 5000 parts of water, 15 parts of 50% aqueous sodium hydroxide solution were added, and the resulting slurry was agitated at room temperature (25°–30°) for two hours and then filtered. The filter cake was washed with water, until the effluent wash liquor was neutral, dried and ground. The yield of product, in the form of a bright red pigment, was 89.5 parts (98% of theory).

EXAMPLE 3

One hundred parts of 2,5 - dianilino - terephthalic acid were added to 555 parts of a hot (160°) polyphosphoric acid solution prepared as described in Example 1, Part 1, and the mixture was stirred at 160°–165° for 1 hour. After cooling the resulting mixture to 60°, 917 parts of 95% sulfuric acid were added, while cooling to keep the temperature from exceeding 60°, and the resulting mixture was drowned into a large excess of ice-water mixture. The resulting precipitated quinacridone was filtered off, washed acid free, and reslurried with 3% aqueous sodium hydroxide. The slurry was stirred for 2 hours, filtered, and washed alkali free. A bluish red quinacridone pigment in finely divided form was obtained in a yield of 98% of theory.

EXAMPLE 4

Part 1.—A polyphosphoric acid solution was prepared in the manner described in Example 1, Part A, from 650 parts of phosphorus pentoxide and 300 parts of 85% ortho-phosphoric acid. The $H_3PO_4$ equivalent of the resulting solution was 115%. The $P_2O_5$ equivalent of the resulting solution was 83.45%, and the $H_2O$ equivalent was 16.55%. The $P_2O_5/H_2O$ ratio was 5.04.

Part 2.—Two hundred ten parts of 2,5 - di - (3' - methylphenylamino) - terephthalic acid were stirred with the resulting 950 parts of polyphosphoric acid solution for one hour at 180°–190°. The mixture was then cooled to 50° and drowned into a large excess of water. The resulting precipitate of 3,10 - dimethyl - quinacridone was filtered off and recovered in the manner described in Example 2. There were obtained 180 parts (96% of theory) of a dark red pigment which was in a form directly usable for pigment purposes.

EXAMPLE 5

One hundred parts of 2,5 - di - (2',4' - dimethylanilino) - terephthalic acid were added to 555 parts of a hot (170°–175°) polyphosphoric acid solution prepared as described in Example 1, Part 1. The mixture was stirred at 170°–180° for two hours, cooled to 50°, then to it were added successively 917 parts of 95% sufuric acid and 917 parts of 100% sulfuric acid, and the resulting mass was drowned into 10,000 parts of cold water. The precipitated product was filtered off, washed acid free, and reslurried in 10,000 parts of water containing 30 parts of 50% aqueous sodium hydroxide. The slurry was agitated at 25°–30° for two hours, then filtered, and the filter cake was washed acid free and dried.

There were obtained 87 parts of 2,4,9,11 - tetramethyl quinacridone in the form of a yellowish red pigment in finely divided form directly usable as such for the usual pigment purposes.

EXAMPLE 6

Part 1.—A polyphosphoric acid solution was prepared in the manner described in Example 1, Part A, from 350 parts of phosphorus pentoxide and 255 parts of 85% ortho-phosphoric acid. The $H_3PO_4$ equivalent of the resulting solution was 116%, the $P_2O_5$ equivalent of the resulting solution was 84.1% and the $H_2O$ equivalent was 15.9%. The $P_2O_5/H_2O$ weight ratio was 5.3.

Part 2.—One hundred ten parts of diethyl 2,5 - dianilino -terephthalate were added to the 605 parts of hot (165°–175°) resulting polyphosphoric acid solution and the mixture was stirred for two hours at 170°–180°. After cooling to 80°, the mixture was diluted with 10,000 parts of water and filtered. The product was washed with water, slurried in a 2% aqueous sodium hydroxide solution, refiltered and rewashed. Linear quinacridone was thus obtained in the form of a red-violet finely divided pigment directly usable for pigment purposes.

It will be evident that the invention is not limited to the details of the foregoing illustrative examples and that changes can be made without departing from the scope of the invention.

Thus, instead of the 2,5-diarylamino-terephthalic acids and esters employed in the above specific examples, other 2,5-diarylamino-terephthalic acids and esters may be similarly converted to quinacridones, such as the 2,5-diarylamino-terephthalic acids, mono- and di-methyl esters and mono- and di-ethyl esters derived from the following primary aromatic amines:

ortho-, meta- and para-toluidine
various xylidines
alpha- and beta-naphthylamine
the various ethyl, propyl and butyl analogs of the toluidines and xylidines
lower alkoxy-substituted primary aromatic amines, such as ortho-, meta- and para-anisidine
ortho-, meta- and para-chloroaniline
para-fluoroaniline
para-bromoaniline
para-iodoaniline
the various difluoro-, dichloro-, dibromo- and diiodo-anilines and the corresponding mono- and di-halogen derivatives of the toluidines and xylidines.

I claim:
1. The improvement in the process of preparing a quinacridone by ring-closure of a 2,5-diarylamino-terephthalic compound, which comprises carrying out ring-closure of the 2,5-diarylamino-terephthalic compound with the aid of a polyphosphoric acid as a ring-closing agent.

2. The improvement in the process of preparing a quinacridone defined in claim 1, which comprises carrying out the reaction with a polyphosphoric acid having an initial orthophosphoric acid equivalent of at least 103.5%, as ring-closing agent.

3. The improvement in the process of preparing a quinacridone by ring-closure of a 2,5-diarylamino-terephthalic compound, which comprises heating a mixture containing essentially the 2,5-diarylamino-terephthalic compound and a greater amount by weight of a polyphosphoric acid having an initial composition such that the $P_2O_5:H_2O$ weight ratio thereof is from 3:1 to 8:1, whereby ring-closure of the 2,5-diarylamino-terephthalic compound is effected and a quinacridone is produced.

4. The improvement in the process defined in claim 3 which comprises heating the mixture at a temperature within the range 100° to 250° C.

5. The improvement in the process of preparing a quinacridone by ring-closure of a 2,5-diarylamino-terephthalic acid in which each of the aryl radicals is unsubstituted in at least one ortho-position relative to the amino group, which comprises heating the 2,5-diarylamino-terephthalic acid with a greater amount by weight of a polyphosphoric acid having an initial orthophosphoric acid equivalent of 103.5% to 122.8%, at a temperature not exceeding 250° C. until a quinacridone is produced.

6. A process as defined in claim 5, wherein the heating is carried out at 100° to 200° C.

7. A process as defined in claim 5, wherein the polyphosphoric acid has an initial phosphoric acid equivalent of 113% to 116%.

8. The improvement in the process of preparing a quinacridone by ring-closure of a 2,5-diarylamino-terephthalic acid in which each of the aryl radicals is unsubstituted in at least one ortho-position relative to the amino group, which comprises heating the 2,5-diarylamino-terephahalic acid with at least 4 times its weight of a polyphosphoric acid having an initial orthophosphoric acid equivalent of 110.4% to 121%, at a temperature of 100° to 200° C. until a quinacridone is produced.

9. The improvement in the process of preparing a quinacridone by ring-closure of a 2,5-diarylamino-terephthalic acid in which each of the aryl radicals is unsubstituted in at least one ortho-position relative to the amino group, which comprises heating the 2,5-diarylaminoterephthalic acid with a greater amount by weight of polyphosphoric acid having an initial orthophosphoric acid equivalent of 113% to 116% at a temperature of 100° to 250° C.

10. A process as defined in claim 9, wherein the heating is carried out at 140° to 200° C.

11. A process of preparing a quinacridone which comprises heating a 2,5-diarylamino-terephthalic acid having the formula

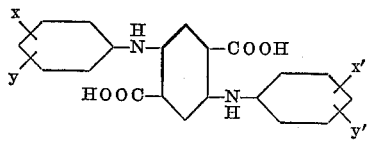

wherein $x$, $y$, $x'$ and $y'$ are individually selected from the group consisting of halogen, lower alkyl, lower alkoxy, aryl and benzo with a greater amount by weight of polyphosphoric acid having an initial orthophosphoric acid equivalent of 103.5% to 122.8%, at a temperature not exceeding 250° C. until a quinacridone is produced, diluting the reaction mixture with water, and separately recovering the quinacridone in the form of finely divided pigment of high tinctorial strength.

12. A process of preparing a quinacridone pigment which comprises heating a mixture of 2,5-diarylaminoterephthalic acid as defined in claim 11 with 4 to 12 times its weight of a polyphosphoric acid having an initial orthophosphoric acid equivalent of 113% to 116%, at a temperature of 140° to 200° C. for a time sufficient to effect ring-closure of said 2,5-diarylamino-terephthalic acid and produce a reaction mixture containing a quinacridone, diluting the reaction mixture with water, and filtering off a quinacridone in the form of finely-divided pigment of high tinctorial strength.

13. A process defined in claim 12, wherein the 2,5-diarylamino-terephthalic acid is 2,5-dianilino-terephthalic acid.

14. A process as defined in claim 12, wherein the 2,5-diarylamino-terephthalic acid is 2,5-ditoluidino-terephthalic acid.

15. A process as defined in claim 12, wherein the 2,5-diarylamino-terephthalic acid is 2,5-dixylidino-terephthalic acid.

16. A process of preparing a quinacridone which comprises heating an ester of a 2,5-diarylamino-terephthalic acid having the formula

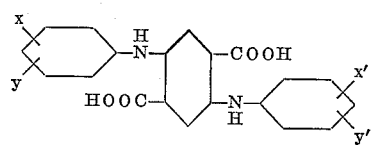

wherein $x$, $y$, $x'$ and $y'$ are individually selected from the group consisting of halogen, lower alkyl, lower alkoxy, aryl and benzo with a greater amount by weight of a polyphosphoric acid having an initial orthophosphoric acid equivalent of 103.5% to 122.8%, at a temperature not exceeding 250° C. until a quinacridone is produced.

17. A process as defined in claim 16, wherein the 2,5-diarylamino-terephthalic ester is a lower alkyl ester of 2,5-dianilino-terephthalic acid.

18. A process as defined in claim 16, wherein the 2,5-diarylamino-terephthalic ester is the diethyl ester of 2,5-dianilino-terephthalic acid.

19. A process of preparing a quinacridone which comprises heating the diethyl ester of 2,5-dianilino-terephthalic acid with 4 to 12 times its weight of a polyphosphoric acid having an initial orthophosphoric acid equivalent of 113% to 116%, at a temperature of 140° to 200° C. until a quinacridone is produced.

References Cited

UNITED STATES PATENTS

| | | | |
|---|---|---|---|
| 2,611,771 | 9/1952 | Marnon | 260—279 |
| 2,821,530 | 1/1958 | Struve | 260—279 |
| 3,201,402 | 8/1965 | Bohler et al. | 260—279 |
| 3,257,405 | 6/1966 | Gerson et al. | 260—279 |

FOREIGN PATENTS

| | | |
|---|---|---|
| 580,924 | 12/1959 | Belgium. |
| 583,317 | 4/1960 | Belgium. |
| 585,921 | 6/1960 | Belgium. |
| 586,007 | 4/1960 | Belgium. |
| 1,233,785 | 5/1960 | France. |
| 1,237,416 | 6/1960 | France. |
| 1,244,061 | 9/1960 | France. |
| 805,247 | 12/1958 | Great Britain. |

OTHER REFERENCES

Brockmann et al.: Ber. Deut. Chem., vol. 89, pp. 1379–1397 (1956), pp. 1392, 1396, and 1397 relied on.

Hein et al.: Jour. Am. Chem. Soc., vol. 79, pp. 427–9 (1957).

Liebermann: Liebigs Annalen, vol. 518, pp. 245–250 (1935).

Uhlig: Angew Chem., vol. 66, pp. 435–6 (1954).

ALEX MAZEL, *Primary Examiner.*

H. J. LIDOFF, DUVAL T. McCUTCHEN, IRVING MARCUS, *Examiners.*

R. PRICE, D. M. KERR, D. G. DAUS,
*Assistant Examiners.*